US005825435A

United States Patent [19]

Vriens et al.

[11] Patent Number: 5,825,435

[45] Date of Patent: Oct. 20, 1998

[54] COLOR CATHRODE RAY TUBE AND DISPLAY DEVICE

[75] Inventors: Leendert Vriens; René A. Stoffels, both of Eindhoven, Netherlands

[73] Assignee: U.S. Philips Corporation, New York, N.Y.

[21] Appl. No.: 522,035

[22] Filed: Aug. 31, 1995

[30] Foreign Application Priority Data

| | | | |
|---|---|---|---|
| Sep. 7, 1994 | [EP] | European Pat. Off. | 94202560 |
| Aug. 7, 1995 | [EP] | European Pat. Off. | 95202148 |

[51] Int. Cl.$^{6}$ .............................. H01J 29/80; H04N 5/64

[52] U.S. Cl. .......................... 348/841; 313/402; 313/364; 313/365; 313/411; 348/454; 348/470

[58] Field of Search .............................. 345/10; 348/555, 348/808, 829, 454, 470, 683, 841; 313/364, 365, 373, 402, 408, 411, 461, 462, 409

[56] References Cited

U.S. PATENT DOCUMENTS

| | | | |
|---|---|---|---|
| 4,210,842 | 7/1980 | Nakayama | 313/403 |
| 4,626,737 | 12/1986 | Takenaka | 313/402 |
| 4,638,452 | 1/1987 | Schultz et al. | 364/900 |
| 4,853,592 | 8/1989 | Strathman | 313/495 |
| 4,942,332 | 7/1990 | Adler et al. | 313/402 |
| 5,055,736 | 10/1991 | Yun | 313/402 |
| 5,378,959 | 1/1995 | Mancini | 313/402 |
| 5,525,858 | 6/1996 | Berton | 313/402 |
| 5,534,746 | 7/1996 | Marks et al. | 313/408 |
| 5,619,094 | 4/1997 | Vriens | 313/402 |

FOREIGN PATENT DOCUMENTS

| | | | |
|---|---|---|---|
| 1004928 | 2/1993 | Belgium | G05B 19/04 |
| 9114988 | 10/1991 | WIPO | G06F 13/12 |

*Primary Examiner*—Thomas D. Lee
*Assistant Examiner*—Jerome Grant, II
*Attorney, Agent, or Firm*—John C. Fox

[57] ABSTRACT

By selecting the number of apertures per vertical row in the shadow mask of a color cathode ray tube to be in the range between 615 and 650, such a cathode ray tube can be used both in a PAL, an NTSC system and a MUSE system without the occurrence of disturbing Moiré effects. In a second embodiment the number of apertures per row ranges between 425 and 450.

12 Claims, 4 Drawing Sheets

COLOR CATHRODE RAY TUBE AND DISPLAY DEVICE

BACKGROUND OF THE INVENTION

The invention relates to a colour cathode ray tube comprising an electron gun for generating at least one electron beam, a colour selection electrode having rows of apertures, a display screen and means for deflecting the electron beam across the colour selection electrode in a line deflection direction transverse to the row of apertures.

Such display devices are known. They are used, inter alia, in television receivers.

A disturbing effect which may occur in such display devices is the so-called Moiré effect. This effect causes light and dark bands or bands of a deviating colour in the image.

In operation, lines are written on the display screen in the line deflection direction by the electron beam(s). The number of lines written on the display screen (the so-called number of active lines) is system-dependent. In the PAL and SECAM systems approximately 537 lines are written on the display screen, (in these systems the signal comprises 625 lines; approximately 50 of said lines are used for coded information; of the remaining 575 lines approximately 7% is scanned beside the display screen, the so-called "overscan"; thus, the overall number of active lines is approximately (625–50)/1.07=537). In the NTSC system approximately 452 active lines are written (the NTSC signal comprises 525 lines). For the so-called MUSE scan-mode the number of active scan lines is approximately 967. In operation, a colour cathode ray tube preferably does not exhibit disturbing Moiré effects for display, irrespective of whether such a tube is used in different systems such as PAL, SECAM, NTSC or MUSE systems.

OBJECTS AND SUMMARY OF THE INVENTION

It is an object of the invention to provide a colour cathode ray tube which can be used in several systems and in which no or only a small amount of disturbing Moiré effect occurs.

To this end, the colour cathode ray tube in accordance with a first aspect of the invention is characterized in that the number of apertures per row ranges between 615 and 650.

Hitherto, "standard" systems customarily have in the order of 590 to 605 apertures per row. In this range (≈590–605) Moiré effects can be avoided to some extent but not completely for PAL, SECAM as well as NTSC use, but this number of apertures gives rise to disturbing Moiré for MUSE applications. There are further other "standard" systems with 455 to 470 apertures per row for PAL, SECAM use only and with 380 to 400 apertures per row for NTSC use only. These latter systems show very disturbing Moiré for the other applications. The colour cathode ray tube in accordance with the invention does not exhibit such disturbing Moiré effects. By virtue thereof the colour cathode ray tube according to the first aspect of the invention is suitable for any television system and thereby a substantial saving in costs can be achieved.

Within the range from 615 to 650 apertures per row, there is a preferred range of 625 to 635. This range is very suitable with respect to reduction of Moiré as well as to possible negative influences of raster distortion on the Moiré effect.

The invention further aims at providing a display device comprising a colour cathode ray tube having an electron gun for generating at least one electron beam, a colour selection electrode having rows of apertures, a display screen and means for deflecting the electron beam across the colour selection electrode in a line deflection direction transverse to the rows of apertures and means for receiving a television signal.

In order to achieve a reduction of the Moiré beyond that in any of the existing "standard" systems, the display device in accordance with the invention is characterized in that, in operation, the so-called $s/a_v$ ratio, where s is the scan pitch for the entire frame and $a_v$ is the vertical mask pitch, is between 9.2/8 and 9.618 for a PAL-system and preferably between 9.3/8 and 9.5/8 for the PAL-system. The corresponding values of the $s/a_v$ ratio for a NTSC system are between 10.91/8 and 11.38/8 and for the MUSE system between 5.11/8 and 5.33/8. A PAL (SECAM), NTSC or MUSE display device is to be understood to mean within the scope of the invention a display device which is suitable for receiving, respectively, a PAL (SECAM), an NTSC or MUSE signal.

An embodiment in which the aspect ratio of the cathode ray tube in the display system is approximately 16:9 comprises means to display on the screen a received signal in an expanded mode in such manner that the $s/a_v$ ratio ranges between 10.7/8 and 11.3/8 for a PAL system or between 12.7/8 and 13.4/8 for a NTSC system.

An embodiment in which the aspect ratio of the cathode ray tube in the display system is approximately 4:3 comprises means to display on the screen a received signal in an compressed mode in such manner that the $s/a_v$ ratio ranges between 8.9/8 and 9.6/8 for a NTSC system.

The inventors have furthermore realized that there is also a need for colour cathode ray tubes that can be used in display devices which receive a television signal but can also be used in personal computers or graphic displays. The number of lines written on the screen for such systems differ from the PAL, SECAM, NTSC and MUSE systems. The number of lines written on the screen equal to 480, 600 and 768 for the so-called VGA, SVGA and XGA scan modes, respectively. When a correction is made for the underscan usually applied with VGA, SVGA and XGA, one gets an apparent number of scan lines for the full mask height (comparable to 537 for PAL and 452 for NTSC) equal to approximately 520 for the VGA system, approximately 645 for the SVGA system and approximately 830 for the so-called XGA system. Known colour cathode ray tubes when used in a display system for receiving a television signal (for instance a PAL signal with approximately 537 written lines, below for simplicity also indicated as a television mode) as well as in a display systems for graphic display (using for instance a SVGA system with approximately 645 written lines, below for simplicity also indicated as a graphic mode) show in one of the two systems (SVGA) significant Moiré patterns. The cathode ray tube in accordance with the first aspect of the invention can also be used in graphic display systems using the VGA or XGA system.

The inventors have realized that apart from the cathode ray tube in accordance with the first aspect of the invention it is possible to achieve a cathode ray tube which can be used in a PAL system television display system as well as in most graphic display systems, including a SVGA system.

To provide a colour cathode ray tube which can be used in a television as well as a in graphic mode a colour cathode ray tube in accordance with a second aspect of the invention is characterized in that the number of apertures per row ranges between 425 and 450, preferably 435 and 450.

Such a colour cathode ray tube shows little or no Moiré patterns when used in a PAL system, as well as when used in the VGA or SVGA graphic modes. This enables one and the same colour display tube to be used in graphic display devices as well as in television sets. Significant savings in manufacturing costs can thereby be achieved.

BRIEF DESCRIPTION OF THE DRAWINGS

These and further aspects of the invention will be explained in greater detail by means of an example and with reference to the accompanying drawing, in which.

Figure 1:
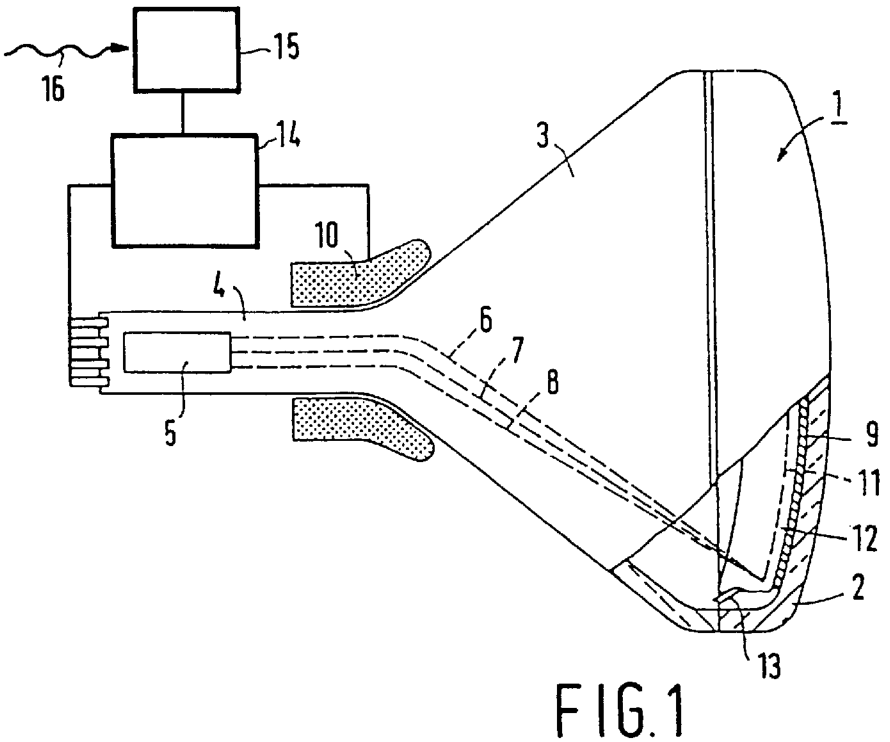
FIG. 1 is a colour cathode ray tube.

The Figures are diagrammatic.

In the Figures, like reference numerals refer to like parts.

DESCRIPTION OF THE PREFERRED EMBODIMENTS

FIG. 1 is a partly perspective view of a cathode ray tube 1. Said cathode ray tube 1 comprises an evacuated envelope 3 having a display window 2, and a neck 4. In the neck there is provided an electron gun 5 for generating, in this example, three electron beams 6, 7 and 8. On the inside of the display window 3 there is provided a luminescent display screen 9 which, in this example, comprises phosphor elements luminescing in red, green and blue. On their way to the screen 9, said electron beams 6, 7 and 8 are deflected across the screen 9 by means of a deflection unit 10, which is located at the junction between the neck and the cone, and pass through the colour selection electrode, in this example the shadow mask 11 which comprises a thin plate having apertures 12. The electron beams 6, 7 and 8 pass through said apertures 12 at a small angle with respect to each other and each electron beam impinges on phosphor elements of only one colour. Said Figure also diagrammatically shows the drive mechanism 14 of the electron gun and the deflection unit as well as the receiving means 15 for receiving a signal 16. Depending on the system the receiving means are capable of receiving a PAL, SECAM, NTSC or MUSE television signal.

Figure 2:
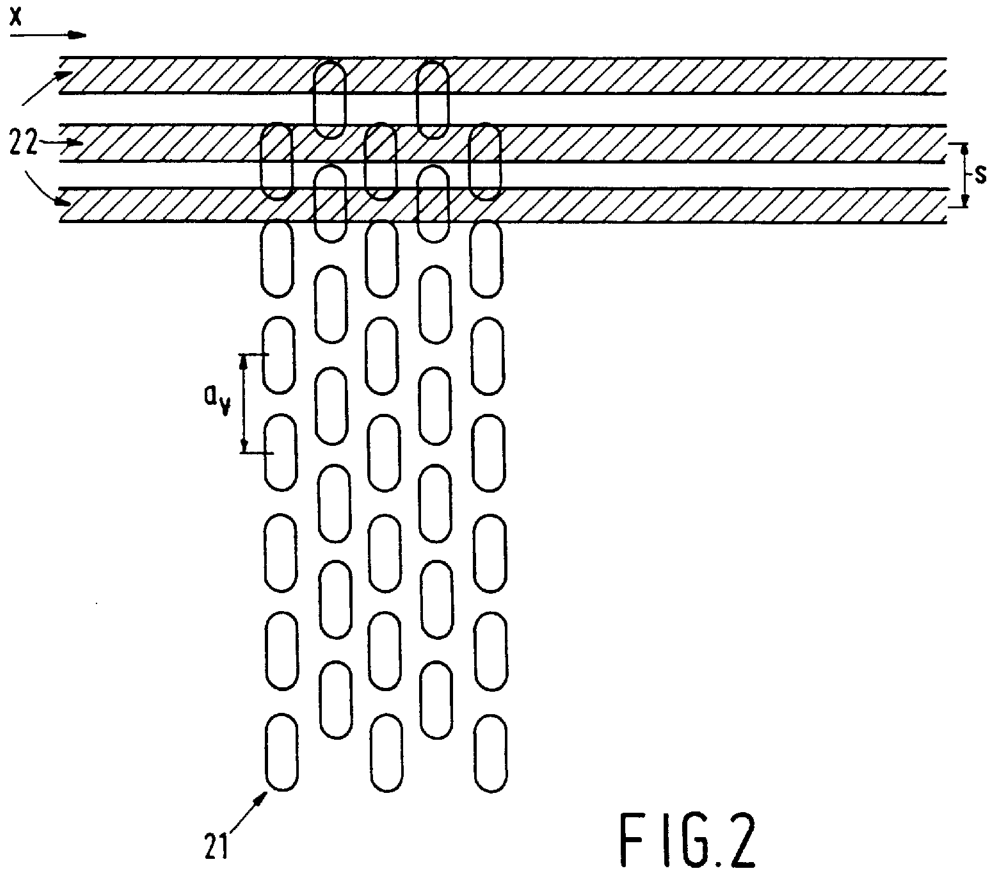
FIG. 2 is a detail of a colour selection electrode.

FIG. 2 is a top view of a detail of a colour selection electrode. Said colour selection electrode comprises a number of rows of apertures 21. Said rows extend transversely to the line deflection direction x. In successive rows the apertures are offset relative to each other in a direction transverse to the line deflection direction. Scanning lines 22 are also shown. The direction transverse to the line deflection direction is also called the field deflection direction. In most cathode ray tubes and display systems the field deflection direction is the vertical direction and the line deflection direction is the horizontal direction. The rows of apertures are therefore aligned in the vertical direction. Said scanning lines diagrammatically show where the electron beam(s) is (are) incident on the shadow mask.

In the case of the so-called PAL and SECAM system, which is used in Europe, Asia, Africa and parts of South-America, the number of lines which are incident on the shadow mask and which impinges on the display screen after passing through the apertures of the shadow mask is approximately 537. The number of active lines of the NTSC system used e.g. in the USA is approximately 452. In Japan the MUSE system is used wherein the number of active lines is approximately (1125−90)11.07=937. In FIG. 2 the scanning-line pitch s is shown. This is the distance between the scanning lines. The distance between the apertures (vertical mask pitch) $a_v$ is also shown.

Interference of the pattern of apertures in the colour selection electrode with the scanning-line pattern causes Moiré effects. Moiré effects occur in horizontal directions (in which case horizontal bars are visible in the image displayed) and at oblique angles (oblique bars appear in the image). Combinations thereof, which appear for example in the form of a diamond pattern, are also possible. In each of the systems (PAL-SECAM; NTSC, MUSE) different Moiré effects occur.

The invention makes it possible to provide a colour cathode ray tube which can be used in the various existing systems and applications without the occurrence of disturbing Moiré effects. By virtue thereof, a substantial saving in costs can be achieved; in various types of display devices the same colour-cathode ray tube can be used. It is also possible to use the same colour selection electrode for different types of colour cathode ray tubes. The invention also provides a cathode ray tube which does not exhibit disturbing Moiré patterns when it is used for PAL (SECAM), NTSC or MUSE system. Regional restriction for use of a colour cathode ray tube in a television system are removed in a cathode ray tube according to the first aspect of the invention.

The colour cathode ray tube in accordance with the invention is characterized in that the number of apertures per row ranges between 615 and 650, and preferably between 625 and 635. This corresponds to an $s/a_v$ ratio (where s is the scan pitch for the entire frame and $a_v$ is the mask pitch) between 9.2/8 and 9.6/8 for a PAL-system and preferably between 9.3/8 and 9.5/8 for the PAL-system. The corresponding ranges for the $s/a_v$ ratio for a NTSC system are between 10.91/8 and 11.38/8 and for the MUSE system between 5.11/8 and 5.33/8. A PAL (SECAM), NTSC or MUSE display device is to be understood to mean within the scope of the invention a display device which is suitable for receiving, respectively, a PAL (SECAM), an NTSC or MUSE signal. The invention is in particular useful for large screen devices (larger than 50 cm) and also for wide screen devices (devices with a aspect ratio larger than 4:3, for instance 16:9).

The $s/a_v$ ratio is in first order approximation the same as the ratio of the number of apertures in a row and the number of lines of the complete frame scanned over the apertures. So, for the PAL-system (approximately) 537 lines scanned over the apertures) 615 apertures per row corresponds to an $s/a_v$ ratio of 615/537=1.15=9.2/8. 625 apertures per row corresponds to $s/a_v$=625/537=9.3/8.

The invention also relates to a display device comprising such a colour cathode ray tube.

Hitherto it was known that the $s/a_v$ ratio has an influence on the Moiré effect. It was assumed that Moiré patterns were generated when $s/a_v$ was equal to 2n/8 where n is a whole number and no Moiré patterns were generated when $s/a_v$ were (2n+1)/8. $s/a_v$ ratios were thus chosen to be symmetrical with respect to the "forbidden" values 2n/8. Within the framework of the present invention it has however been realized that the best ratios are not symmetrical with respect to the "forbidden" ratios 2n/8. More in particular it has been realized that the "forbidden" ratio $s/a_v$ of 8/8 corresponds to still-picture moire with a high amplitude, and thus very disturbing, whereas the "forbidden ratio" $s/a_v$ of 10/8 corresponds to motion moire with a small amplitude. It had not been recognized before that the difference in Moiré amplitudes is extremely large, under normal operating conditions more than a factor of 10. On the basis of the above insight the "best ratio" in between the ratios 8/8 and 10/8 has been found to lie very asymmetrical in said range i.e. between 9.2/8 and 9.6/8. Lower values (i.e. including the value 9/8) will increase the still-picture Moiré. Therefore in a PAL-system the $s/a_v$ ratio is best at 9.4 (+0.2)/8 corresponding to a number of apertures of between approximately 615 and 650. Lower values (including the hitherto believed "optimal value" of 9/8) will increase the still-picture Moiré effect resulting in a deterioration of the picture quality. In the absence of raster distortion an $s/a_v$ value between 9.2/8 and 9.3/8 would be optimal. However raster distortion means that over the mask the $s/a_v$ ratio shows a variation. An increase of the $s/a_v$ ratio to higher values than 9.2–9.3/8 leads to less disturbing Moiré effects than a decrease below said values. Therefore preferably the $s/a_v$ ratio is somewhat higher than 9.3/8 in order to create a "safety margin". Values for $s/a_v$ higher than 9.6/8, however, could introduce motion Moiré. The indicated values for the $s/a_v$ ratio (between 9.2/8 and 9.6/8) for the PAL-system correspond to $s/a_v$ values for the NTSC system between 10.91/8 and 11.38/8 and for the MUSE system between 5.11/8 and 5.38/8.

What holds for the $s/a_v$ range between 8/8 and 10/8, i.e. that within the frame-work of the invention is has been realized that the $s/a_v$ range used should be chosen very asymmetrical with respect to the "forbidden" values 8/8 and 10/8, and more in particular closer to 10/8 than to 8/8, also holds for the $s/a_v$ value range between 4/8 and 6/8. The "best" range in between 4/8 and 6/8 lies much closer to 6/8 than to 4/8 which is indeed the case for the above given range 5.11/8–5.33/8 (MUSE).

A further aspect of the invention is that it has been recognized that the $s/a_v$ ratio 12/8 is also much less forbidden than 8/8. Somewhat larger $s/a_v$ ratios, more close to 12/8, for NTSC application, according to the invention in the range 10.91/8 to 11.38/8 therefore also result in a reduction of Moiré.

Therefore, having the number of apertures between 615 and 650 and preferably between 625 and 635 provides a cathode ray tube which can advantageously be used in PAL, SECAM, NTSC as well as MUSE systems.

Within the framework of the invention the lines can be scanned in the so-called interlace manner, in which first the even or odd lines are scanned, whereafter the other lines are scanned, or the lines can be scanned progressively.

In the progressive scan mode the Moiré patterns are generally even more reduced.

Figure 3A:
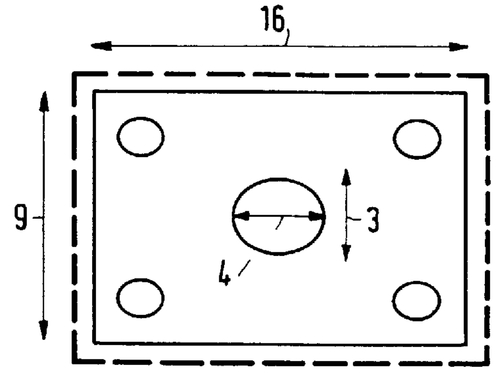
FIG. 3A to 3D illustrate aspects of the invention relating to the display of 4:3 images on a 16:9 display screen.
Figure 3B:
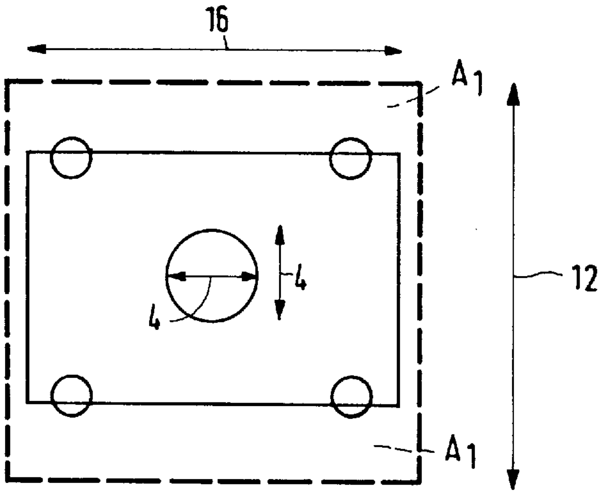
Figure 3C:
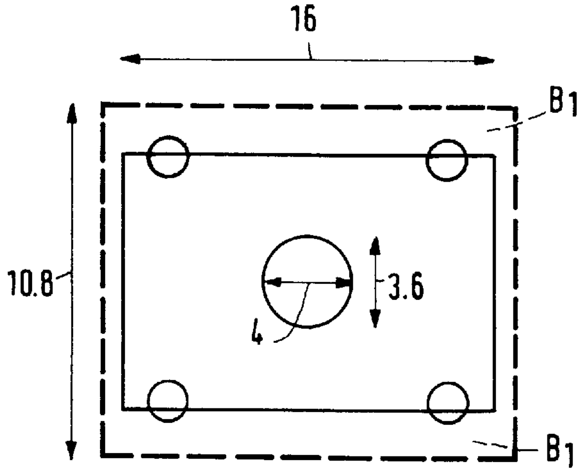
Figure 3D:
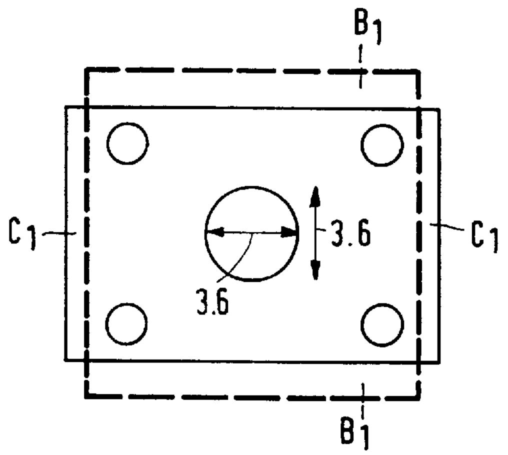
Figure 3E:
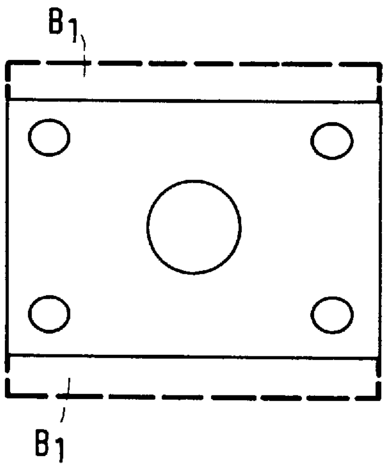

For display devices with a larger aspect ratio (i.e. the aspect ratio being larger than 4:3) and more in particular for display devices in which the aspect ratio is 16:9 a further aspect of the invention is illustrated in FIG. 3A to 3D. An image with an aspect ratio of 4:3 cannot fill a screen with an aspect ratio of 16:9. In order to better fill the screen the display device can be provided with means for expanding the image in the horizontal direction FIG. 3A shows a wide screen display device on which a 4:3 image is displayed. However, if, as hitherbefore usual the image displayed is thus expanded in the vertical direction by a factor 1.333 the $s/a_v$ ratio also changes by a factor 4:3. This means that for a PAL system in the expand mode the $s/a_v$ ratio changes from approximately 9.4/8 to 1.333*9.4/8=12.5/8. For such a $s/a_v$ ratio of Moiré effects can be disturbing. The Moiré effects are substantially reduced by expanding the image such that the resulting $s/a_v$ ratio ranges between 10.7/8 and 11.3/8. Using a display device of the NTSC type in the conventional expand mode would change the $s/a_v$ ratio from approximately 11/8 to 14.7/8. For such a $s/a_v$ ratio of Moiré effects can also be disturbing. The Moiré effects are substantially reduced by expanding the image in the vertical direction to a lesser extent such that the resulting $s/a_v$ ratio ranges between 12.7/8 and 13.4/8. FIGS. 3A to 3D illustrate aspects of the invention relating to the display of 4:3 images on a 16:9 screen. FIG. 3A shows for a PAL system the dimensions of an image broadcast in the 4:3 format, when displayed on a 16:9 screen and expanded only in the horizontal direction. The screen is indicated by full lines, the image displayed on the screen by dotted lines. Since there is usually an overscan the dotted lines extend slightly beyond the full lines. For simplicity it is assumed that the original, undistorted image comprised five circles, one in the centre of the image and one at each corner. As can be seen the image is portrayed in a distorted manner, where the circles have become ovals, the ratio of height and width of the ovals being 3:4. The width is in this figure indicated by 4 and the height by 3. In subsequent figures the width and height of the displayed images will also be indicted. This distortion of the image displayed on the screen is in itself a known problem. FIG. 3B shows the conventional manner of dealing with this problem. The image is expanded in the vertical direction (by means of increasing the line spacing s) by a factor of 1.333. FIG. 3C shows an aspect of the invention. In this figure the image is also expanded in the vertical direction by a smaller factor. The expansion factor is established that the for a PAL or SECAM system the resulting $s/a_v$ ratio ranges between 10.7/8 to 11.3/8 and for the NTSC system the resulting $s/a_v$ ratio ranges between 12.7/8 and 13.4/8. The resulting expansion factor ranges approximately, to same extent depending on the $s/a_v$ ratio in the non-expanded mode and the system, between 1.15 and 1.25 instead of being 1.33. The decreased expansion of the image in the vertical direction has several advantages. The number of lines (and thus the extent in which the image is not displayed) that is lost is less, since whereas in the conventional system 33% of the originally displayed image is lost, in a device according to the invention only about 20% of said image is lost. In FIGS. 3B and 3C the parts of the image that are lost are indicated by A1 and B1. Clearly it can be seen that the areas B in FIG. 3C are smaller than the areas A in FIG. 3B. Furthermore, and most importantly, the $s/a_v$ ratio has decreased from approximately 12.5/8 (for the PAL system) and 14.7/8 (for the NTSC system) in FIG. 3B to approximately 11/8 (PAL) and 13/8 (NTSC) in FIG. 3C. This has the advantage effect that Moiré effects are strongly reduced. A further advantageous effect is that the ability to display fine details is improved. As is shown in FIG. 3C the dimensions of the displayed image are 4 (width): 3.6 (height). Although this is a clear improvement on the situation as shown in FIG. 3A further improvements are possible. One possible further improvement is shown in FIG. 3D. In this figure the image is compressed in the horizontal direction by a factor of 0.9, resulting in dimensions of 3.6(width):3.6(height). If the originally displayed picture would have fitted perfectly on the screen such a reduction would have resulted in the occurrence of two black bars (indicated by C1 in FIG. 3D) on the left and right side of the displayed image, each bar having a horizontal dimension of approximately 5% of the horizontal dimension of the display screen. However in reality images are displayed with a so-called overscan of 7%. Therefore the bars are much smaller, only approximately 1,5% (1 cm) at each side. Such bars are barely visible. Of course it is also possible to compress the image in the horizontal direction by a smaller amount (for instance by a factor of 0.95) in which case bars are no longer visible, but the displayed image will be somewhat distorted and have a width:height ratio of 3.8:3.6. For most images such a distortion will however be hardly visible. An alternative is shown in FIG. 3E. In this figure the horizontal dimension of the image displayed in compressed in the centre of the screen resulting in a perfect circle. At the edges of the screen the horizontal dimension is however somewhat expanded. This result in a perfect image at the centre but a somewhat distorted image at the edges of the screen, while the image completely fills the screen. In this embodiment the image therefore is subjected to an increase in the $s/a_v$ ratio (by approximately 1.15 to 1.25) combined with a panoramic distortion in the horizontal direction.

Figure 4A:
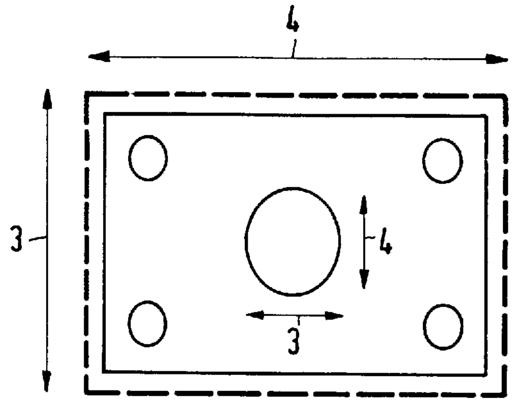
FIG. 4A to 4C illustrate aspects of the invention relating to displaying a 16:9 image on a 4:3 display screen.
Figure 4B:
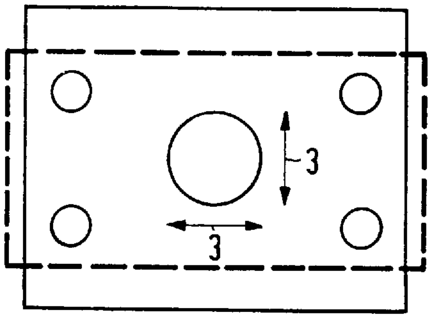
Figure 4C:
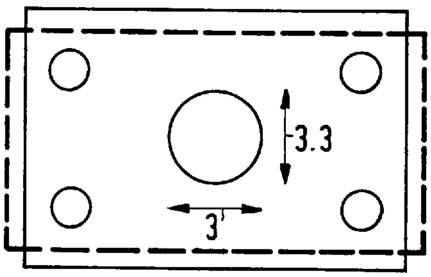

A related problem occurs when a 16:9 image is to be displayed on a cathode ray tube having a 4:3 screen. FIG. 4A shows an 16:9 image displayed on a 4:3 screen. The image is clearly distorted. A conventional manner of solving this problem is compressing the image in the vertical direction by a factor of 1.33. FIG. 4B show the resulting image. Black bars occur at above and below the image. For an NTSC system reducing the vertical dimensions of the image displayed by a factor of 1.33 would reduce the $s/a_v$ from between 10.91/8 and 11.38/8 to between 8.2/8 to 8.5/8. For these $s/a_v$ ratios severe Moiré effects occur. According to an embodiment of the invention a display system of the NTSC type having a cathode ray tube with screen with an aspect ratio of 4:3 comprises means for compressing in the vertical direction the image displayed on the screen in such manner that the $s/a_v$ ranges between 8.9/8 and 9.6/8. For these $s/a_v$ ratio almost no Moiré effects occur. The vertical dimensions of the image are then reduced by a factor of approximately 1.2. Any resulting distortion of the image can, if wanted, be reduced or overcome by an expansion of the image in the horizontal direction. The resulting image (without expansion in the horizontal direction) is shown in FIG. 4C. Apart from the fact that much less Moiré effects occur a further advantage is that the black bars are much smaller. FIGS. 3A to 4C therefore illustrate aspects of the invention relating to problems which occur when an image of a certain aspect ratio as to be displayed on a display screen of a different (larger or smaller size). By establishing the expansion or compression factor for the horizontal direction to be between 1.15 and 1.25 instead of the conventional 1.33 a more advantageous $s/a_v$ ratio (in regards of Moiré effects) as well as a better filling of the screen results.

The inventors have furthermore realized that there is also a need for colour cathode ray tubes which can be used in display devices which receive a television signal but can also be used in personal computers or graphic displays. The number of lines written on the screen for such personal computer or graphic display systems differs from the PAL, SECAM, NTSC and MUSE systems. The number of lines written over the full screen are approximately (taken into account the fact that for graphic display purposes conventionally a underscan of approximately 8% is applied) 520 for the VGA system, approximately 650 for the SVGA system and approximately 830 for the so-called XGA system. Known colour cathode ray tubes when used in a display system for receiving a television signal (for instance a PAL signal with approximately 537 written lines) as well as in a display systems for graphic display (using for instance a VGA system with approximately 520 written lines) show in one of the two systems significant Moiré patterns. The colour cathode ray tube according to the first aspect of the invention shows little or no Moiré patterns for the VGA and for the XGA systems and can therefore be used in a very wide range of applications, both regionally and as far as applications is concerned.

The inventors have realized that apart from the cathode ray tube in accordance with the first aspect of the invention it is possible to achieve a cathode ray tube which can be used in a PAL system television display system as well as in some graphic display systems although it is less suitable for SVGA.

To provide a colour cathode ray tube which can be used in a television as well as a graphic mode a colour cathode ray tube in accordance with a second aspect of the invention is characterized in that the number of apertures per row ranges between 425 and 450, preferably 435 and 450.

Such a colour cathode ray tube shows little or no Moiré patterns when used in a PAL or SECAM system, or when used in the VGA or SVGA graphic modes. This enables one and the same colour display tube to be used in graphic display devices as well as in television sets. Significant savings in manufacturing costs can thereby be achieved. The $s/a_v$ ratios lie between 6.5/8 to 6.8/8 for a PAL system between 6.7/8 and 7/8 when used in the VGA graphic mode and between 5.35/8 to 5.6/8 when used in a SVGA graphic mode. Although none of these ratios corresponds exactly to an ideal ratio according to the hitherbefore accepted theory in each of the indicated modes the $s/a_v$ ratio is such that no or hardly any Moiré patterns occur. This aspect of the invention enables at least regionally (in those countries where the PAL or SECAM system is used) to remove restriction in the type of systems (television or graphic display systems) in which the cathode ray tube can be used. The range 425–435 is advantageous if a VGA, SVGA or XGA system is used with less then conventional underscan, e.g. 4–5%. Less than conventional underscan has the advantage that more efficient use is made of the available phosphor screen area.

It is remarked that the colour cathode ray tube according to the first aspect of the invention (a colour cathode ray tube having between 615 and 650 apertures per vertical row) is suitable for use in the VGA and XGA mode since the $s/a_v$ ratios for these modes are between approximately 9.5/8 and 10/8 (VGA) and approximately 5.9/8 and 6.3/8 (XGA). For these ranges little or no Moiré effects occur.

In both aspects of the invention restrictions on the use of a cathode ray tube in differing systems are removed. Hereby significant savings in manufacturing costs can be achieved.

Tables 1 and 2 summarize the different aspects of the present invention. Table 1 illustrates that depending on the number of apertures in the shadow mask a colour cathode ray tube according to the present invention can be used in several systems and modes. Table 2 summarizes the different systems and the corresponding $s/a_v$ ratios in non-expanded as well as in expanded modes or compressed modes, where expansion and compression relates to the vertical direction.

TABLE 1 cathode ray tubes according to the invention and their use in display systems.

| Cathode ray tube (number of apertures per vertical row indicated) | suitable for the systems (approximate s/a, ratio in standard mode indicated in parentheses) |
|---|---|
| 615–650 | PAL (9.2/8–9.6/8), NTSC (10.9/8–11.38/8), MUSE (5.11/8–5.33/8), VGA (9.5/8–10/8), XGA (5.9/8–6.3/8) |
| 435–450 | PAL (6.5/8–6.8/8), VGA (6.7/8–7/8), SVGA (5.35/8–5.6/8) |

TABLE 2

Television display systems according to the invention with s/a, ratio in standard and expanded or compressed mode, according to embodiments of the invention.

| system | aspect ratio | s/a, ratio |
|---|---|---|
| PAL/SECAM | any | 9.2/8–9.6/8 |
| | larger than 4:3, in | 9.218–9.6/8 (standard mode) |
| | particular 16:9 | 10.7/8–11.3/8 (expanded mode) |
| NTSC | any | 10.9/8–11.38/8 |
| | larger than 4:3 in | 10.9/8–11.38/8 (standard mode) |
| | particular 16:9 | 12.7/8–1.4/8 (expanded mode) |
| | approximately 4:3 | 10.9/8–11.38/8 (standard mode) |
| | | 8.9/8–9.6/8 (compressed mode) |
| MUSE | any | 5.11/8–5.33/8 |
| PAL/SECAM | any | 6.5/8–6.8/8 |

Summarizing it can be stated that by selecting the number of apertures per vertical row in the shadow mask of a colour cathode ray tube to be in the range between 615 and 650, such a cathode ray tube can be used in many systems, including the PAL, NTSC and MUSE systems as well as in several systems used for graphic displays without the occurrence of disturbing Moiré effects. In a second embodiment the number of apertures per row ranges between 425–450, preferably between 435 and 450. Such a colour cathode ray tube can be used in a PAL system as well as in several graphic display systems.

We claim:

1. A colour cathode ray tube comprising an electron gun for generating at least one electron beam, a colour selection electrode having rows of apertures, a display screen and means for deflecting the electron beam(s) across the colour selection electrode in a line deflection direction transverse to the rows of apertures, characterized in that the number of apertures per row ranges between 615 to 650.

2. A colour display tube as claimed in claim 1, characterized in that the number of apertures per row ranges between 625 to 635.

3. A display device of the PAL or SECAM type comprising a colour cathode ray tube having an electron gun for generating at least one electron gun, a colour selection electrode having rows of apertures, a display screen and means for deflecting the electron beam across the colour selection electrode in a line deflection direction transverse to the rows of apertures and comprising means for receiving a PAL or SECAM television signal, characterized in that, in operation, the s/$a_v$ ratio, where s is the scan pitch for the entire frame and $a_v$ is the vertical mask pitch, lies between 9.2/8 and 9.6/8.

4. A display device as claimed in claim 3, characterized in that the s/$a_v$ ratio lies between 9.3/8 and 9.5/8.

5. A display device as claimed in claim 4, characterized in that the colour cathode ray tube comprises a display screen with an aspect ratio larger than 4:3 and the display comprises means to expand in the field deflection direction the image displayed on the screen in such manner that the s/$a_v$ ratio of the image displayed in the expand mode ranges between 10.7/8 and 11.3/8.

6. A display device as claimed in claim 3, characterized in that the colour cathode ray tube comprises a display screen with an aspect ratio larger than 4:3 and the display device comprises means to expand in the field deflection direction the image displayed on the screen in such manner that the s/$a_v$ ratio of the image displayed in the expand mode ranges between 10.7/8 and 11.3/8.

7. A display device of the NTSC type comprising a colour cathode ray tube having an electron gun for generating at least one electron gun, a colour selection electrode having rows of apertures, a display screen and means for deflecting the electron beam across the colour selection electrode in a line deflection direction transverse to the rows of apertures and comprising means for receiving a NTSC television signal, characterized in that, in operation, the s/$a_v$ ratio, where s is the scan pitch for the entire frame and $a_v$ is the vertical mask pitch, lies between 10.9/8 and 11.38/8.

8. A display device as claimed in claim 7, characterized in that the colour cathode ray tube comprises a display screen with an aspect ratio larger than 4:3 and the display device comprises means to expand in the field deflection direction the image displayed on the screen in such manner that the s/$a_v$ ratio of the expanded image ranges between 12.7/8 and 13.4/8.

9. A display device as claimed in claim 7, characterized in that the colour cathode ray tube comprises a display screen with an aspect ratio of approximately 4:3 and the display device comprises means to compress in the field deflection direction the image displayed on the screen a received signal in such manner that the s/$a_v$ ratio of the compressed image ranges between 8.9/8 and 9.6/8.

10. A display device of the MUSE type comprising a colour cathode ray tube having an electron gun for generating at least one electron gun, a colour selection electrode having rows of apertures, a display screen and means for deflecting the electron beam across the colour selection electrode in a line deflection direction transverse to the rows of apertures and comprising means for receiving a MUSE television signal, characterized in that, in operation, the s/$a_v$ ratio, where s is the scan pitch for the entire frame and $a_v$ is the vertical mask pitch, lies between 5.11/8 and 5.33/8.

11. A colour cathode ray tube comprising an electron gun for generating at least one electron beam, a colour selection electrode having rows of apertures, a display screen and means for deflecting the electron beam(s) across the colour selection electrode in a line deflection direction transverse to the rows of apertures, characterized in that the number of apertures per row ranges between 425 to 450, preferably 435 to 450.

12. A display device of the PAL or SECAM type comprising a colour cathode ray tube having an electron gun for generating at least one electron beam, a colour selection electrode having rows of apertures, a display screen and means for deflecting the electron beam across the colour selection electrode in a line deflection direction transverse to the rows of apertures and comprising means for receiving a PAL or SECAM television signal, characterized in that, in operation, the s/$a_v$ ratio, where s is the scan pitch for the entire frame and $a_v$ is the vertical mask pitch, ranges between 6.5/8 and 6.8/8.

* * * * *